United States Patent
Min

(10) Patent No.: US 9,834,106 B2
(45) Date of Patent: Dec. 5, 2017

(54) METHOD FOR RESETTING STATE OF CHARGE OF BATTERY IN HYBRID VEHICLE

(71) Applicants: HYUNDAI MOTOR COMPANY, Seoul (KR); KIA MOTORS CORPORATION, Seoul (KR)

(72) Inventor: Kyung In Min, Seongnam-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 134 days.

(21) Appl. No.: 14/942,736

(22) Filed: Nov. 16, 2015

(65) Prior Publication Data

US 2016/0159238 A1   Jun. 9, 2016

(30) Foreign Application Priority Data

Dec. 9, 2014   (KR) .......................... 10-2014-0175976

(51) Int. Cl.
*B60L 11/18* (2006.01)

(52) U.S. Cl.
CPC ....... *B60L 11/1838* (2013.01); *B60L 11/1861* (2013.01); *Y02T 10/7005* (2013.01); *Y02T 10/7044* (2013.01)

(58) Field of Classification Search
CPC .......................... B60L 11/1838; B60L 11/1861
USPC .......................................................... 320/109
See application file for complete search history.

(56) References Cited

U.S. PATENT DOCUMENTS

| 6,166,517 A | 12/2000 | Wakashiro et al. |
| 6,841,972 B2* | 1/2005 | Koo ........................ B60K 6/46 320/132 |
| 7,634,369 B2* | 12/2009 | Lim et al. ............. H02J 7/0029 320/130 |
| 7,800,345 B2* | 9/2010 | Yun et al. .......... G01R 31/3675 320/132 |
| 7,830,117 B2* | 11/2010 | Ambrosio et al. .... B60L 3/0046 320/109 |
| 8,552,686 B2* | 10/2013 | Jung et al. ............ H01M 10/44 180/65.1 |
| 8,692,507 B2* | 4/2014 | Chen ................... B60L 11/1868 320/103 |

(Continued)

FOREIGN PATENT DOCUMENTS

JP   2000-175306 A   6/2000
KR   10-2003-0050125 A   6/2003

(Continued)

*Primary Examiner* — Sun Lin
(74) *Attorney, Agent, or Firm* — McDermott Will & Emery LLP

(57) ABSTRACT

A method for resetting an SOC of a battery in a hybrid vehicle includes calculating a first SOC value of the battery after the hybrid vehicle starts. A second SOC value of the battery is calculated using an open circuit voltage (OCV) of the battery. The second SOC value of the battery and a third SOC value for vehicle start-up are compared with each other, an SOC value of a battery management system is reset to the third SOC value when the second SOC value of the battery is smaller than the third SOC value, and the SOC value of the battery management system is reset to the second SOC value of the battery when the second SOC value of the battery is larger than the third SOC value.

5 Claims, 1 Drawing Sheet

(56) References Cited

U.S. PATENT DOCUMENTS

| 8,975,866 | B2* | 3/2015 | McGrath et al. ... B60L 11/1837 320/109 |
|---|---|---|---|
| 2004/0119441 | A1 | 6/2004 | Koo |

FOREIGN PATENT DOCUMENTS

| KR | 10-2009-0020174 A | 2/2009 |
| KR | 10-2009-0042367 A | 4/2009 |
| KR | 10-2009-0052766 A | 5/2009 |
| KR | 10-2009-0112244 A | 10/2009 |

\* cited by examiner

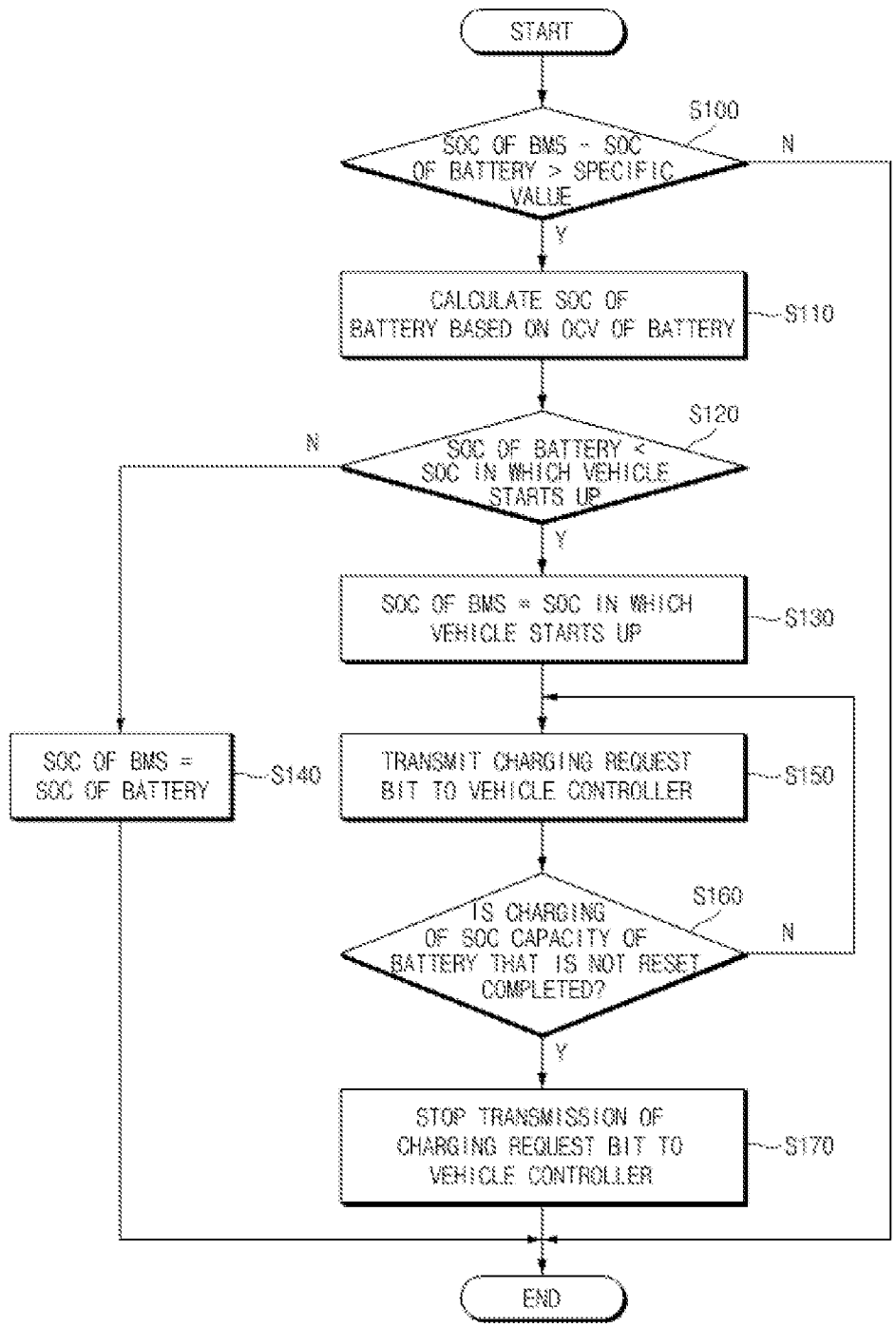

METHOD FOR RESETTING STATE OF CHARGE OF BATTERY IN HYBRID VEHICLE

CROSS-REFERENCE TO RELATED APPLICATION

This application is based on and claims the benefit of priority to Korean Patent Application No. 10-2014-0175976, filed on Dec. 9, 2014 in the Korean Intellectual Property Office, the disclosure of which is incorporated herein in its entirety by reference.

TECHNICAL FIELD

The present disclosure relates to a method for resetting a state of charge (SOC) of a battery in a hybrid vehicle, and more particularly, to a method of resetting an SOC of a battery in a hybrid vehicle in consideration of whether or not the vehicle starts up.

BACKGROUND

A hybrid vehicle efficiently combines two or more kinds of different power sources with each other, for example, an engine obtaining a torque by burning fuel (fossil fuel such as gasoline, or the like) and an electric motor obtaining a torque by electric power of a battery.

A general hybrid vehicle includes a high voltage battery, a battery management system (BMS), a motor, a motor control unit (MCU), an inverter, and a main relay.

Particularly, the high voltage battery has functions of supplying electrical energy required for assisting the motor at the time of accelerating the hybrid vehicle and storing electrical energy generated by regeneration of the motor at the time of decelerating the vehicle or generation of an engine margin output therein.

In order to perform above functions of the battery, the battery management system (BMS) measures a current, a voltage, a temperature, and the like, of the battery to calculate a state of charge (SOC) of the battery, maximum available charging power Pin and discharging power Pout, and the like, and transmits information on the SOC, the charging power, and the discharging power to a vehicle control unit such as an engine control unit (ECU). The ECU performs a control for the highest performance of the hybrid vehicle through distribution of power of the engine and the motor using the information on the SOC, the charging power, and the discharging power.

Here, the battery management system (BMS) may erroneously calculate a real SOC of the battery due to an error or the like. The battery management system (BMS) has a function of resetting the SOC of the battery in accordance with the real SOC of the battery. However, the current battery management system (BMS) has a problem that the SOC of the battery is reset regardless of whether or not the vehicle is driven or starts up.

SUMMARY

The present disclosure has been made to solve the above-mentioned problems occurring in the prior art while advantages achieved by the prior art are maintained intact.

An aspect of the present inventive concept provides a method for resetting a state of charge (SOC) of a battery in a hybrid vehicle capable of preventing a start-up defect of the hybrid vehicle due to reset of an SOC of a battery management system (BMS) in the hybrid vehicle by resetting the SOC of the BMS of the hybrid vehicle to a minimum SOC in which the hybrid vehicle may start up when it is necessary to reset the SOC of the battery due to a difference between a real SOC of the battery and the SOC of the BMS.

Other objects and advantages of the present disclosure may be understood by the following description and will be more clearly appreciated by exemplary embodiments of the present inventive concept. It may be easily appreciated that objects and advantages of the present disclosure may be realized by means mentioned in the claims and a combination thereof.

According to an exemplary embodiment of the present inventive concept, a method for resetting a state of charge (SOC) of a battery in a hybrid vehicle includes calculating a first SOC value of the battery when the hybrid vehicle starts. A second SOC value of the battery is calculated using an open circuit voltage (OCV) of the battery. The second SOC value of the battery and a third SOC value for vehicle start-up are compared with each other, an SOC value of a battery management system (BMS) is reset to the third SOC value when the second SOC value of the battery is smaller than the third SOC value, and the SOC value of the battery management system (BMS) is reset to the second SOC value of the battery when the second SOC value of the battery is larger than the third SOC value for the vehicle start-up. A charging request bit is transmitted to a vehicle controller in order to charge a fourth SOC value of the battery that is not yet reset when the SOC value of the battery management system (BMS) is reset to the third SOC value. Whether or not the charging of the fourth SOC value of the battery is completed is confirmed.

When a value obtained by subtracting the second SOC value of the battery from the SOC value of the battery management system (BMS) is smaller than a specific value, the method for resetting the SOC of the battery may end.

The SOC value for the vehicle start-up, which is a minimum SOC value for starting up the vehicle, may be 10 to 15% of a maximum available capacity of the battery.

The method may further include stopping the transmission of the charging request bit to the vehicle controller when the charging of the fourth SOC value of the battery that is not reset is completed.

The method may further include retransmitting the charging request bit to the vehicle controller when the charging of the fourth SOC value of the battery that is not reset is not completed.

BRIEF DESCRIPTION OF THE DRAWINGS

The above and other objects, features and advantages of the present disclosure will be more apparent from the following detailed description taken in conjunction with the accompanying drawings.

The FIGURE is a flow chart for describing a method for resetting a state of charge (SOC) of a battery in a hybrid vehicle according to an exemplary embodiment of the present inventive concept.

DETAILED DESCRIPTION

The above-mentioned objects, features, and advantages will become more obvious from the following description described below in detail with reference to the accompanying drawings. Therefore, those skilled in the art to which the present disclosure pertains may easily practice a technical idea of the present disclosure. Further, in describing the present disclosure, in the case in which it is determined that a detailed description of a well-known technology associated with the present disclosure may unnecessarily make the gist of the present disclosure unclear, it will be omitted. Hereinafter, exemplary embodiments of the present inventive concept will be described in detail with reference to the accompanying drawings.

A state of charge (SOC) of a battery in a vehicle, which is a value indicating a percentage of a current retention capacity to a maximum available capacity, may be represented by the following Equation 1.

$$SOC(t) = \frac{Q_t}{Q_{max}} \times 100[\%] \qquad \text{[Equation 1]}$$

Here, t means a time, $Q_t$ means a quantity of electric charge in the time t, and $Q_{max}$ means a maximum quantity of electric charge.

That is, the SOC may be defined as a ratio of a quantity of electric charge currently retained by the battery to the maximum available capacity that may be accommodated by the battery, and the maximum available capacity $Q_{max}$ is decreased as the temperature of the battery becomes low and is decreased as the battery ages.

The SOC may be calculated by measuring charging and discharging currents flowing in the battery by a battery management system (BMS) to calculate a current amount and then adding or subtracting the calculated current amount to or from a current SOC, as represented by the following Equation 2.

$$SOC[n+1]=SOC[n]+k\cdot\int Idt \qquad \text{[Equation 2]}$$

Here, in order to correct the SOC, a real SOC (hereinafter, referred to as '$SOC_{real}$') of the battery is calculated using a relationship between a current and a voltage of the battery, a resistance, and the like, to correct SOC[n] by a ratio corresponding to k so that SOC[n+1] follows $SOC_{real}$ as represented by the following Equation 3.

$$SOC[n+1]=SOC[n]-\int Idt+k\cdot(SOC_{real}-SOC[n]) \qquad \text{[Equation 3]}$$

The FIGURE is a flow chart for describing a method for resetting a state of charge (SOC) of a battery in a hybrid vehicle according to the present disclosure.

Referring to the FIGURE, after the hybrid vehicle starts, a battery management system (BMS) measures a cell voltage, a current, and a temperature of a high voltage battery and then calculates a state of charge (SOC) value of the battery using an average value of the measured cell voltage, current, and the temperature.

The battery management system (BMS) compares a value obtained by subtracting the calculated SOC value of the battery from an SOC value of the battery management system (BMS) and a specific value (predetermined value, for example, 10%) with each other (S100). Here, the specific value means a reset condition of the SOC value of the battery management system (BMS).

The battery management system (BMS) calculates or resets an SOC of the battery using an open circuit voltage (OCV) of the battery (S110) when the value obtained by subtracting the calculated SOC value of the battery from the SOC value of the battery management system (BMS) is larger than the specific value.

However, the battery management system (BMS) ends the reset of the SOC of the battery when the value obtained by subtracting the calculated SOC value of the battery from the SOC value of the battery management system (BMS) is smaller than the specific value.

Here, the SOC value of the battery is calculated from measured data obtained through an experiment, that is, an OCV vs. SOC map.

Then, the battery management system (BMS) compares the calculated SOC value of the battery with an SOC value in which the vehicle may start up (S120). Here, the SOC value in which the vehicle may start up means a minimum SOC value for starting up the vehicle, and may be 10 to 15% of the maximum available capacity of the battery.

When the calculated SOC value of the battery is smaller than the SOC value in which the vehicle may start up (is not a region in which the vehicle may start up), the SOC value of the battery management system (BMS) is reset to the SOC value in which the vehicle may start up (S130).

However, when the calculated SOC value of the battery is larger than the SOC value in which the vehicle may start up (is a region in which the vehicle may start up), the SOC value of the battery management system (BMS) is reset to the SOC value of the battery (S140).

Next, the battery management system (BMS) transmits a charging request bit to a vehicle controller such as electronic control unit (ECU) (S150) in order to charge the SOC value of the battery that is not yet reset in the case in which the SOC value of the battery management system (BMS) is reset to the SOC value in which the vehicle may start up.

The battery management system (BMS) then confirms whether the charging of the SOC value of the battery that is not reset is completed (S160).

Next, the battery management system (BMS) stops the transmission of the charging request bit to the vehicle controller (S170) when the charging of the SOC value of the battery that is not reset is completed.

However, when the charging of the SOC value of the battery that is not reset is not completed, the battery management system (BMS) retransmits the charging request bit to the vehicle controller (upper controller or hybrid controller) in order to charge the SOC value of the battery that is not yet reset.

As described above, according to the exemplary embodiment of the present inventive concept, a start-up defect of the hybrid vehicle due to the reset of the SOC of the battery management system (BMS) may be prevented.

In addition, according to the exemplary embodiment of the present inventive concept, an additional charging request bit is transmitted to the vehicle controller so that the vehicle may start up, thereby preventing the battery from being excessively used.

Hereinabove, although the present disclosure has been described with reference to restrictive configurations and the accompanying drawings, the present disclosure is not limited thereto, but may be variously modified and altered by those skilled in the art to which the present disclosure pertains without departing from the spirit of the present disclosure and equivalents to the following claims.

What is claimed is:

1. A method for resetting a state of charge (SOC) of a battery in a hybrid vehicle, the method comprising:
    calculating a first SOC value of the battery after starting up the hybrid vehicle;
    calculating a second SOC value of the battery using an open circuit voltage (OCV) of the battery;
    comparing the second SOC value of the battery with a third SOC value for vehicle start-up, resetting an SOC value of a battery management system (BMS) to the third SOC value when the second SOC value of the battery is smaller than the third SOC value, and resetting the SOC value of the BMS to the second SOC value of the battery when the second SOC value of the battery is larger than the third SOC value;

transmitting a charging request bit to a vehicle controller in order to charge a fourth SOC value of the battery that is not yet reset when the SOC value of the BMS is reset to the third SOC value; and confirming whether the charging of the fourth SOC value of the battery is completed.

2. The method of claim 1, wherein, before the step of calculating a second SOC value of the battery, when a value obtained by subtracting the first SOC value of the battery from the SOC value of the BMS is smaller than a specific value, the method for resetting the SOC of the battery ends.

3. The method of claim 1, wherein the third SOC value for the vehicle start-up, which is a minimum SOC value for starting up the hybrid vehicle, is 10 to 15% of a maximum available capacity of the battery.

4. The method of claim 1, further comprising stopping transmitting the charging request bit to the vehicle controller when the charging of the fourth SOC value of the battery is completed.

5. The method of claim 1, further comprising retransmitting the charging request bit to the vehicle controller when the charging of the fourth SOC value of the battery is not completed.

* * * * *